Nov. 26, 1957     H. J. SHEPPARD     2,814,131
PSYCHOPHYSICAL DRIVER TESTING UNIT
Filed Dec. 29, 1955     3 Sheets-Sheet 1
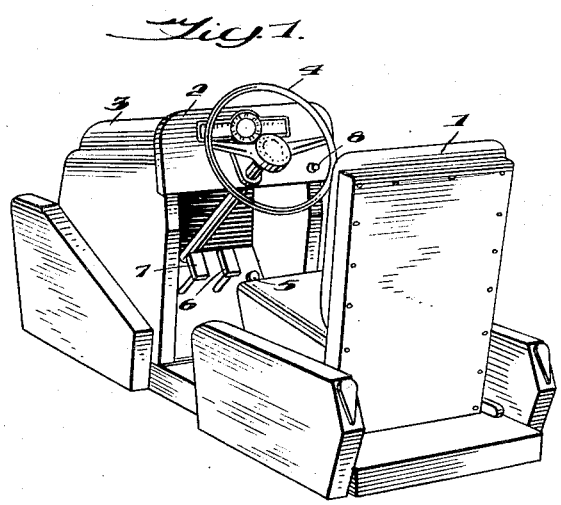
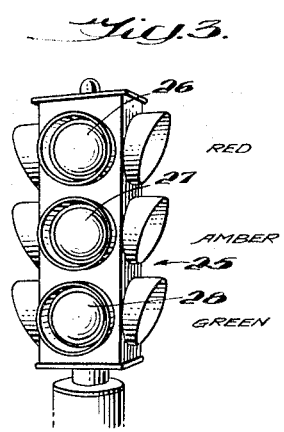
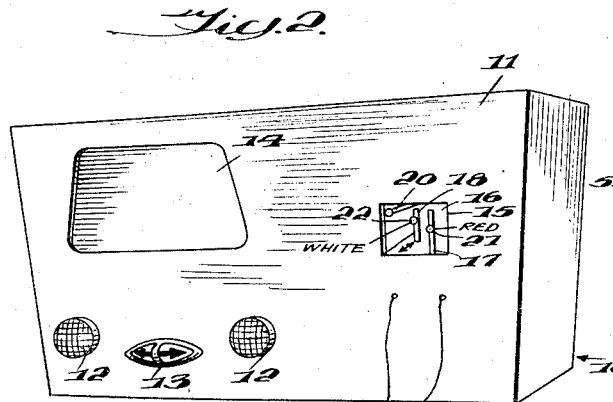
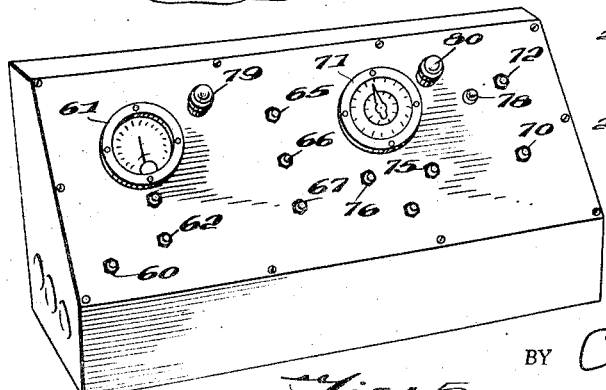
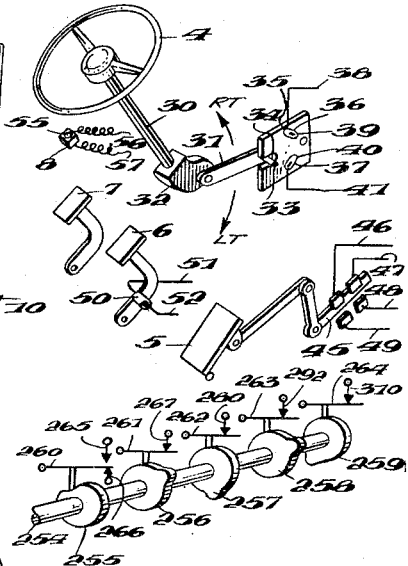
INVENTOR
HERBERT J. SHEPPARD,
BY Charles J. Elderkin
ATTORNEY

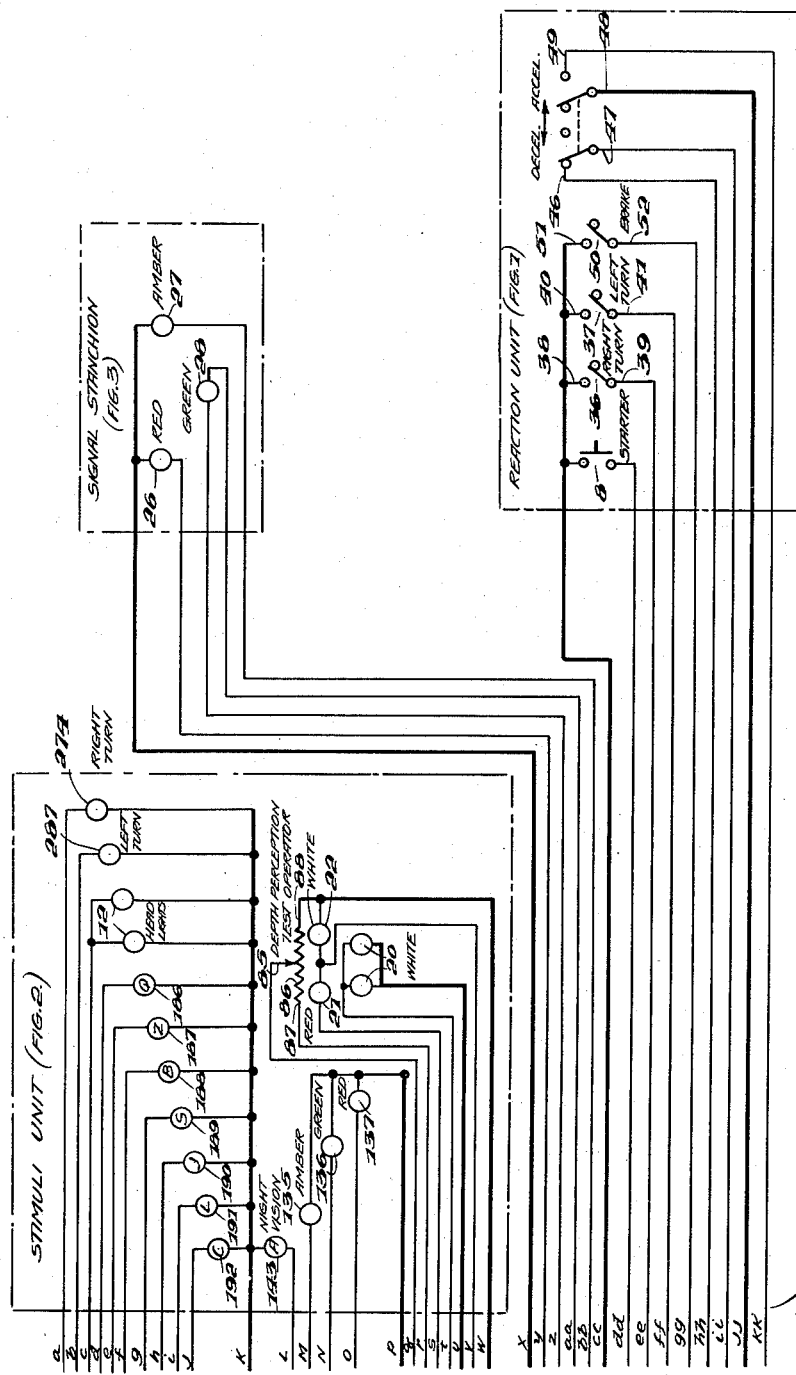

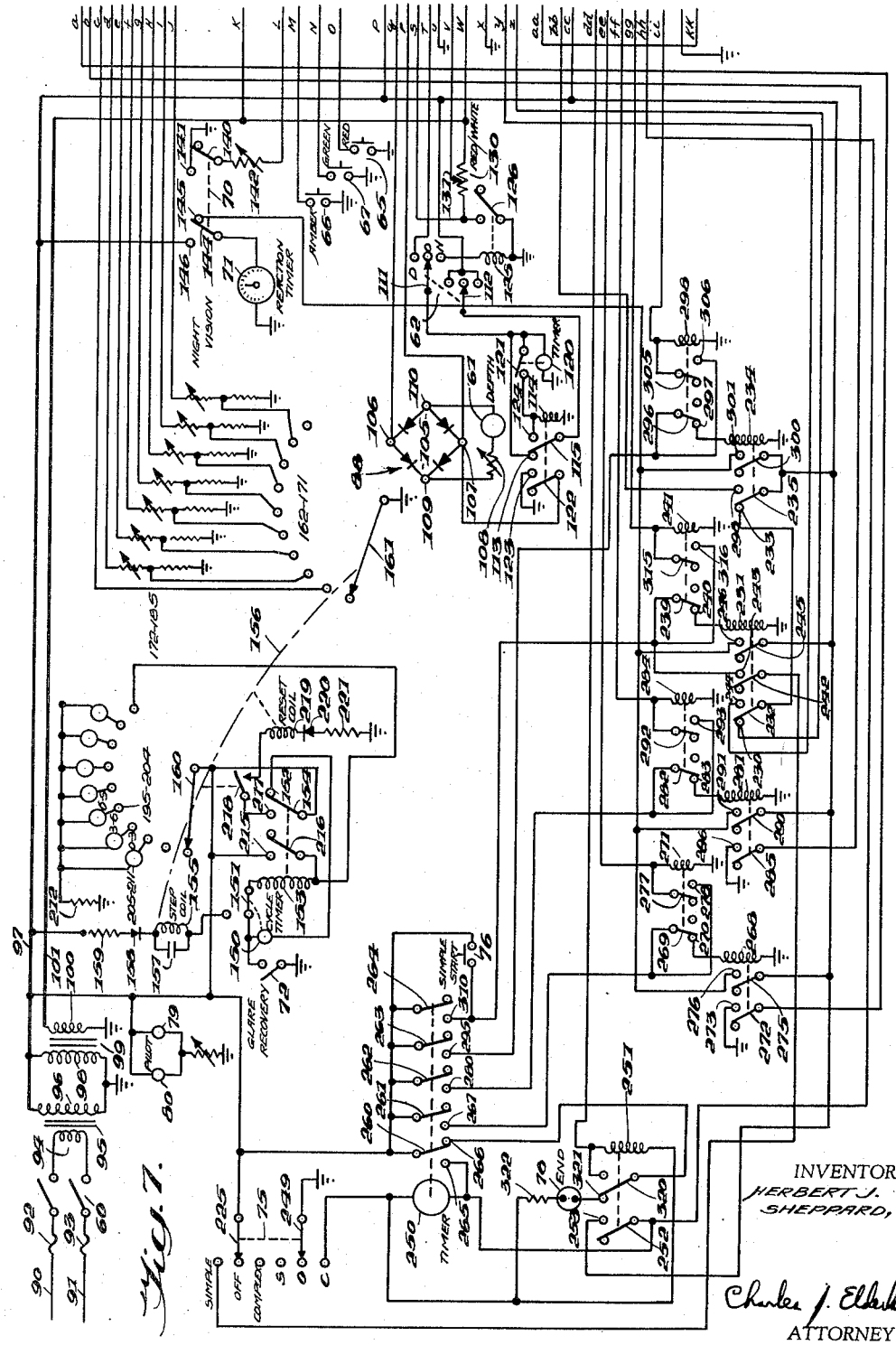

United States Patent Office 2,814,131
Patented Nov. 26, 1957

2,814,131

PSYCHOPHYSICAL DRIVER TESTING UNIT

Herbert J. Sheppard, New York, N. Y.

Application December 29, 1955, Serial No. 556,132

11 Claims. (Cl. 35—11)

This invention relates to testing apparatus, and, more particularly, to apparatus for testing the reactions and qualifications of automobile drivers.

As is well known, the number of cars on the Nation's highways has increased tremendously in the past few years, with a corresponding increase in the number of accidents. Great effort has been expended in attempting to reduce the hazards of driving, including extensive publicity campaigns. One proposed solution to the problem is testing the reactions and qualifications of drivers. Deficiencies and inabilities exposed by such a test, if remediable, could be corrected, and, if not correctable, could be used as a possible basis for qualification or refusal of a driver's license.

Several different types of testing apparatus have previously been suggested. Some have been quite complex, involving the use of movie films for projecting road scenes to the driver, and requiring proper control of a steering wheel to change the angle of projection of the film in accordance with the changing road scene. Others have tested characteristics that have little relationship to those actually employed in driving a car.

The apparatus of the present invention is designed to test the reactions and qualities actually employed in operation of an automobile, with a minimum complexity of equipment and a maximum simplicity of indication.

The apparatus of the invention, generally speaking, comprises a driver testing station having controls simulating closely those of a conventional automobile, and used as reaction members, a stimuli unit and signal stanchion disposed so as to be viewed from the testing station for exhibiting various indications to be reacted upon by the driver being tested, and a control unit for actuating the stimuli and noting the reactions thereto.

The apparatus will now be more fully described in conjunction with the accompanying drawings showing a preferred embodiment of the invention. In the drawings, Fig. 1 is a perspective view of the reaction unit at the testing station;

Fig. 2 is a perspective view of the stimuli and depth perception testing unit;

Fig. 3 is a perspective view of a signal stanchion employed in conjunction with the stimuli unit to furnish the indications to which the driver is to react;

Fig. 4 is a perspective view of some of the reaction controls of Fig. 1, showing the switches which they operate;

Fig. 5 is a perspective view of the control unit;

Fig. 6 is a schematic diagram of the electrical connections of the stimuli unit, the signal stanchion, and the reaction unit;

Fig. 7 is a schematic diagram of the apparatus of the control unit; and,

Fig. 7a is a partial schematic view of the timer of Fig. 7, showing the cam-operated switches thereof.

The signal station and reaction unit of Fig. 1 includes the usual seat 1, dash 2 and frame 3. Conventional steering wheel 4, accelerator pedal 5, brake pedal 6, clutch pedal 7, and starting switch 8 are also shown. These controls are made as nearly as possible identical to the corresponding controls of a conventional automobile to heighten the sense of realism to the driver being tested.

As will be obvious, the driver seats himself before the steering wheel and actuates the various controls in accordance with the stimuli presented him by the apparatus now to be discussed.

The stimuli unit, generally indicated at 10 in Fig. 2, comprises a large cabinet 11 having its front surface facing the driver. A pair of sealed-beam type headlights 12 project through the front panel and are focused toward the driver, for a purpose to be described. A plastic cover 13 having right hand and left hand turn signals formed thereon and being adapted to be lighted up by appropriate lamps, is mounted between the headlights. A translucent glass plate 14 covers a large opening in the front surface of the cabinet, and a plurality of indicators, later to be described, are visible, when operated, through the glass.

At the right side thereof, cabinet 11 is provided with an opening 15 which exposes to view a chamber 16 extending into the cabinet. In the chamber are mounted a pair of elongated parallel pegs 17 and 18, peg 17 being fixed to the bottom wall of the chamber and peg 18 being movable with respect to peg 17 perpendicularly to its length and to the plane formed by opening 15, as indicated by the two-headed arrow. The position of peg 18 is controlled by endless string 19 which is fixed to the peg and projects through a pair of openings in the front wall of the cabinet.

String 19 is adapted to be grasped by the driver, and the object of this portion of the test is to determine the depth perception of the driver. In the test, peg 18 is positioned out of line with peg 17 initially, and the driver told to align the two pegs by control of string 19. This kind of test of depth perception is well-known, but the apparatus of the present invention improves and extends its application by providing different lighting conditions to simulate day and night driving, and by improving the indication and reliability of the test.

Lighting of chamber 16 is provided by electric lamps 20, only one of which is shown, fixed to the walls of the chamber, or by red and white indicator lamps 21 and 22, mounted on pegs 17 and 18, respectively. Lamps 20 are designed to simulate the lighting conditions for daytime driving, and lamps 21 and 22 to simulate night-time illumination, lamp 21 representing the tail-lights of a car immediately ahead, and lamp 22 representing the headlights of an approaching car.

The signal stanchion 25 of Fig. 3 is a replica of the usual traffic light stanchion having the red "stop" lamp 26 at top, the amber "caution" lamp 27 in the middle, and the green "go" lamp 28 at the bottom.

The controls of Fig. 1 are shown in Fig. 4, with parts broken away to show the switches operated thereby. The steering post 30 is connected to an oscillating crank arm 31 through a conventional type of motion-translating device 32. As shown by the arrows, clockwise rotation of the steering wheel is converted into downward movement of the crank arm, and counter-clockwise rotation into upward movement. Crank arm 31 carries a pin 33 which rides in a slot 34 in a plate 35 pivotable about its rear end. Mounted on the plate are a pair of normally open mercury switches 36 and 37 having leads 38 and 39, and 40 and 41, respectively. When the wheel 4 is rotated clockwise, switch 37 closes a circuit between leads 40 and 41, and, when the wheel is rotated counter-clockwise, switch 36 completes a circuit between leads 38 and 39.

The accelerator or gas pedal 5 of Fig. 4, through a conventional crank arrangement, controls a switch arm 45 which completes a circuit between leads 46 and 47 when the accelerator is un-depressed, as shown, and completes a circuit between leads 48 and 49 when the accelerator is depressed.

The brake pedal 6 carries a normally-open mercury switch 50 which completes a circuit between leads 51 and 52 of the switch when the brake pedal is depressed.

The starter switch 8 carries a push button 55 which closes a circuit between leads 56 and 57 when the push button is depressed.

The apparatus of the present invention is designed to test the depth perception or judgment of the driver under both day and night illumination conditions. For such test, the control unit of Fig. 5, in addition to the power switch 60, is provided with a depth perception meter 61 and a switch 62 for selecting night or day judgment tests.

A second test to be performed with this apparatus is one involving color recognition. However, rather than using the charts for testing color blindness commonly employed, the present apparatus allows actuation of the conventional red, amber and green lamps of the usual traffic light. For such test, the control unit is provided with push-button switches 65, 66, and 67, labelled "Red," "Amber," and "Green," respectively.

The present invention is also intended for testing of night vision, involving the ability to recognize objects under night-time illumination. For such use, the control unit has a night vision switch 70 and a reaction clock timer 71.

This invention further envisions a test for glare recovery, that is, the speed of recovery of the eyes of the driver from the glare caused by approaching headlights to an ability to recognize objects. This test is accomplished through use of a glare recovery switch 72.

The final tests to be performed with the present apparatus include one for determining the time for a simple reaction to a stimulus and another for determining the time for a series of reactions to a sequence of stimuli. In addition to the timer 71, these tests require a simple-complex switch 75 for selecting which of the tests is to be conducted, and a start switch 76 for beginning the simple reaction time test. To signal the end of the complex reaction time test, a lamp indicator 78 is provided.

The control panel, in addition, carries a pair of pilot lamps 79 and 80 for indicating that power is being supplied to the various components.

The tests which can be carried out with the apparatus of this invention will be more fully described in conjunction with Figs. 6, 7 and 7a. In those figures, referring first to the depth perception test and Fig. 6, the movable peg 18 has fixed to it for movement therewith the arm or slider 85 of a rheostat 86, the arm being movable with respect to the resistance of the rheostat in correspondence with movement of the moveable peg. Since the resistance between the arm and one end, e. g. 87, of the resistance, when the two pegs are aligned, can be readily determined, the resistance between the arm and end 87 will be a measure of the distance between the two pegs measured along the line of movement of the movable peg.

End 87, arm 85, and opposite end 88 of the rheostat 86 are connected to the control unit of Fig. 7 through leads labelled r, q, and w, respectively. For convenience in circuit tracing, the leads between the units of Fig. 6 and the control unit of Fig. 7 are all given reference letters, beginning with a at the tops of the sheets and progressing through kk at the bottom, the same letters being used on both sheets.

The resistance between arm 85 and end 87 of the rheostat 86 is measured by a bridge-type measuring circuit, generally indicated at 88 in Fig. 7. To provide power for the bridge, and for the other components of the testing apparatus, the control unit is connected to a source of A.-C. power, such as the usual household mains, not shown, by leads 90 and 91. These leads are connected through fuses 92 and 93 to the swingers of the double-pole, double-throw power switch 60, shown also in Fig. 5. When the power switch is in its on position, it supplies power to the primary 94 of a transformer 95. The secondary 96 of the transformer has its upper end connected to a bus 97, and its lower end grounded, so that a relatively high voltage is supplied between bus 97 and ground.

A lower voltage source is also provided for the equipment through connection of the primary 98 of a stepdown transformer 99 across secondary 96, the secondary 100 of the transformer 99 having its upper end connected to a bus 101 and the lower end grounded. The voltage between bus 101 and ground may be of the order of 6.3 volts.

Returning now to discussion of the depth perception testing apparatus, the bridge-type measuring apparatus 88, shown at the middle right-hand side of Fig. 7, includes the usual rectifier bridge 105 having one junction 106 connected to lead q and the opposite junction 107 connected to lead r. Thus, the resistance between arm 85 and end 87 of the rheostat of Fig. 6 is shunted across the bridge between junctions 106 and 107. Lead w connected to end 88 of the rheostat is connected to power through low voltage power bus 101.

The unbalance of the bridge is detected and indicated by depth perception meter 61 which, in series with variable resistance 108, is connected across the bridge between junctions 109 and 110 thereof. The meter, which conveniently may be a microammeter, may be calibrated in inches and resistance 108 adjusted so that inches displacement of peg 18 with respect to peg 17 may be read in inches on the meter.

As indicated above, the depth perception or judgment test may be given under simulated daytime or simulated night-time illumination conditions. Switch 62 selects which conditions are to obtain and is of the double pole, triple-throw type having swingers 111 and 112. The "day" contact of swinger 111 is connected to lead t which connects to one terminal of parallel-connected lamps 20 of Fig. 6. These lamps may be of the fluorescent type and are disposed in the chamber 16 of the stimuli unit, as pointed out above. The other terminal of the lamps is connected to ground through lead u.

The swinger 111 of switch 62 is connected to a normally-closed contact 113 of a relay 114. The relay 114 is of the double-pole, double-throw type and has its first swinger 115 normally contacting contact 113. Swinger 115 is connected to swinger 112 of switch 62, which has both its "night" and "day" contacts connected to high-voltage power bus 97. Therefore, when switch 62 is actuated to its "day" position, lamps 20 are connected across the high voltage source and illuminate chamber 16 with simulated daytime lighting.

Normally-closed contact 113 of relay 114 is also connected to one terminal of an electrically operated timer 120 which has its other terminal grounded. The timer, when energized by actuation of swinger 112 of switch 62 to either the day or night position, closes a pair of contacts 121 only after a time delay, which may advantageously be of the order of 3 seconds, and which determines the length of the depth perception test. The normally-open contacts 121, when closed, connect one terminal of the coil of relay 114 to high-voltage power bus 97 through swinger 112 of switch 62, the other terminal of the coil being grounded. Therefore, at the end of the time set by timer 120, relay 114 is actuated, breaking the circuit between lamps 20 and the power source through contact 113 of the relay. At the same time, the second swinger 122 of relay 114 swings from an unconnected contact to contact 123 which is connected to ground. This action completes a power circuit to bridge-measuring circuit 88, since swinger 122 is connected to junction 107 of the bridge 105. The meter then reads the distance between peg 17 and peg 18, in inches. It will be noted that the meter reading is taken only after the time set for the test by timer 120 expires. Relay 114 is kept actuated through a holding contact 124 contacted by swinger 115, until swinger 112 of switch 62 is moved to the "off" position.

Nighttime illumination conditions are obtained through use of "night" contact of swinger 111 of switch 62. The coil of a relay 125 is connected between this "night" contact and ground, so as to cause energization of the relay through swinger 111, normally-closed contacts 113 and 115 of relay 114, swinger 112 of switch 62 and power bus 97. Relay 125 has a grounded swinger 126 which normally contacts an unconnected contact but which, when the relay is energized, connects ground to lead $s$. Lead $s$, in Fig. 6, is connected to one terminal of red lamp 21, mounted on fixed peg 17 of Fig. 2. The other terminal of lamp 21 is connected to one terminal of white lamp 22, mounted on movable peg 18, the common terminals being connected to lead $v$. The other terminal of white lamp 22 is connected to lead $w$, which is connected to low voltage bus 101. When relay 25 is actuated by actuation of switch 62 to the "night" position, the series combination of red and white lamps 21 and 22 is connected across the low voltage power source, so as to provide simulated nighttime illumination in chamber 16.

It is desired to adjust the relative degree of illuminating power of lamps 21 and 22 so that red lamp 21 will produce light, in comparison with that of white lamp 22, which has the relative intensity that the tail lights of an automobile which the driver is approaching from the rear would have to the intensity of the head lights of an automobile approaching from the opposite direction. These relative intensities vary over wide ranges in actual driving conditions, but a good ratio for realism of the test may be taken as 3 to 1, with the intensity of the white light predominating. To enable adjustment of the ratios of light from these lamps, the control unit is provided with a rheostat 130 which has its opposite ends connected to low voltage power bus 101 and lead $s$. The arm 131 of the rheostat is connected to lead $v$, so that adjustment of arm 131 varies the shunting resistances for lamps 21 and 22, and, therefore, their relative light intensities.

In operation of the depth perception testing apparatus of the invention, the peg 18 is displaced an appropriate distance from peg 17 and the driver handed the string 19 with instructions to adjust it to line the pegs up, as soon as the chamber 16 is illuminated. The operator or tester then moves switch 62 from its "off" to its "day" position, thus connecting white lamps 20 from high voltage bus 97 to ground through lead $t$, "day" contact of swinger 111, the swinger, contact 113 and swinger 115 of relay 114, swinger 112 of switch 62, the "day" contact of that swinger, and lead $u$. At the same time, timer 120 is actuated to start the time period of the test by connection of the timer across the high-voltage source through contact 113 and swinger 115 of relay 114, swinger 112 and "day" contact therefor of switch 62, bus 97, and ground.

At the end of the timed interval, timer 120 closes switch 121 to connect the coil of relay 114 across the high voltage source through contacts 121, contact 113 and swinger 115 of relay 114, swinger 112 and the "day" contact thereof, bus 97, and ground. Relay 114 energizes to interrupt the power circuit to the lamps 20 and the timer 120 at contact 13, to establish a holding circuit for itself through its contact 124 and swinger 115, and to complete a circuit between the low voltage source and the bridge measuring circuit 88, through grounded contact 123 and swinger 122 of relay 114, lead $r$, end 87 and end 88 of rheostat 86, lead $w$ and bus 101. Since arm 85 of rheostat 86 is connected to the bridge junction 106 through lead $q$ and end 87 is connected to junction 107 through lead $r$, the meter 61 detects any unbalance of the bridge caused by improper positioning of peg 18 and indicates the distance of peg 18 from alignment with peg 17, in inches. This indication is proportional inversely to the quality of the driver's depth perception.

The tester next moves switch 62 to its off position, thus de-energizing relay 114 by breaking contact 124 and swinger 115. He again changes the position of peg 18 to misalignment with peg 17 and then moves switch 62 to "night" position. Relay 125 is energized by connection across the high voltage source through "night" contact and swinger 111 of switch 62, contact 113 and swinger 115 of relay 114, swinger 112 and "night" contact thereof of switch 62, high voltage bus 97, and ground. Contacts 126 of relay 125 close to connect lamps 21 and 22, on the pegs, across the low voltage source, through lead, contacts 126, ground, bus 101, and lead $w$. At the same time, timer 120 is energized, as before. At the end of the set time interval, the timer closes its contacts 121 to energize relay 114, as before, open the power circuit to relay 125 at contact 113 to de-energize the relay and extinguish lamps 21 and 22, and connect the bridge measuring circuit to rheostat 86, as before. The meter then measures the displacement of pegs 17 and 18 to indicate the quality of the driver's depth perception under nighttime illumination conditions.

A second category of test that may be performed with the apparatus is of the traffic color recognition abilities of the driver. For such a test, the control unit of Fig. 7 is provided with an "amber" switch 66, a "green" switch 67, and a "red" switch 65, as shown in Fig. 5. Each of these switches is of the push-button type and has one of its contacts connected to ground. The other contacts of switches 66, 67 and 65, are connected to lead $m$, lead $n$, and lead $o$, respectively. These leads, in the stimuli unit of Fig. 6, are connected to one terminal of the amber lamp 135, one terminal of green lamp 136, and one terminal of red lamp 137, respectively. The other terminals of these lamps are connected to lead $p$, which is connected to high voltage bus 97 of Fig. 7. The lamps may be of any conventional type, mounted in the stimuli unit of Fig. 2 so as to be visible through glass 14, and having jewels of the respective colors mentioned covering the lamps.

In operation of the color recognition test, the operator actuates switches 65–67 in any desired sequence and the driver calls out the color that he sees. The test, then, is of the color recognition qualities which the driver must actually have in order to operate an automobile in traffic.

A third category of tests is of the night vision of the driver. As is well known, some drivers see perfectly well during the day, but their vision is cut to a dangerous level under nighttime illumination conditions. This test is designed to give an indication of such vision.

For such use, night vision switch 70 of Figs. 7 and 5, is used. The switch is of the double-pole, double throw type having a swinger 140 which normally contacts an unconnected contact corresponding to the off position of the switch, but which, when the switch is turned to its on position, contacts grounded contact 141. The swinger 140 is connected through a variable resistance 142 to lead $l$, which connected to one terminal of lamp 143 of the stimuli unit of Fig. 6. This lamp has its other terminal connected to lead $k$, which is connected to the low voltage bus 101, so that the series combination of resistance 142 and lamp 143 is connected across the low voltage source when switch 70 is turned to its on position.

The variable resistance 142 is provided to enable adjustment of the light given out by lamp 143 when the lamp is energized. The level of light energy is adjusted, in accordance with the level of background light, in such fashion that the length of time, in seconds, that it takes a driver to recognize the lamp is a measure of his vision under night-time illumination conditions.

Lamp 143 is preferably located in the stimuli unit behind glass 14 and illuminates a recognizable outline, such as the letter "A" shown in Fig. 6.

Night vision switch 70 has another swinger 144 which normally contacts contact 145 thereof, but which, when moved to its on position contacts contact 146, connected to high voltage bus 97. The swinger 144 is connected to one side of an electrically-operated reaction clock timer 71, whose other side is grounded. Thus, when the switch 70 is thrown to its on position, the clock timer is connected across the high voltage source and begins operation.

In operation of the night vision test, the tester throws switch 70 to its on position, thus actuating lamp 143 to the degree permitted by the level of resistance of variable resistance 142, and starting the clock timer. When the driver recognizes the letter "A" illuminated by lamp 143, he calls it out and the tester immediately throws switch 70 to its off position to stop the timer and extinguish the lamp. The number of elapsed seconds indicated by the timer, then, is a measure of the night vision capabilities of the driver.

The next test adapted to be made with the apparatus of the invention is of the glare recovery ability of the driver. All drivers have had the experience of being blinded at night by the headlights of an approaching car and being unable to distinguish objects for an appreciable time after the car has passed. Some drivers have an ability to recover from such blindness faster than others, and some recover so slowly as to be a menace on the highway. The apparatus for this test is designed to test the speed of recovery of the driver from glare and to indicate that speed in convenient manner.

The glare recovery test apparatus includes a glare recovery switch 72, of Figs. 5 and 7, which is a simple single-pole, single-throw switch having one contact grounded and the other contact connected to one side of a cycle timer 150. The cycle timer is a conventional device which, when actuated, closes a switch 151 momentarily once during each interval of time, say 3 seconds. The other side of the timer is connected to the normally-closed contact 152 of a relay 153 which has its corresponding swinger 154 connected to high voltage bus 97. Thus, the timer is actuated when the switch 72 is moved to its on position, until relay 153 is actuated.

Switch 151, when closed by operation of the timer connects ground to the lower end of the step coil 155 of a two-section stepping switch 156. The step coil is shunted by a capacitor 157 and has its other end connected through the series combination of a rectifier 158 and voltage-dropping resistor 159 to high voltage bus 97. Thus, every time switch 151 is closed by actuation of the timer 150, step coil 155 receives a pulse of voltage which steps its ganged swingers 160 and 161 up another contact.

Swinger 161 of the stepping switch is connected to ground and adapted to make contact successively with contacts 162—171 of the stepping switch. Contact 162 is open and is the resting point for swinger 161 before the step coil receives its first pulse. Contact 163 is connected by lead c to one terminal of a pair of parallel-connected sealed-beam-type automobile headlights 12, shown in Figs. 2 and 6, the other terminal of the headlights being connected by lead k to the low voltage bus 101 of Fig. 7. Contacts 164—170 are connected each to the junction of two series-connected resistors, 172, 173—184, 185, respectively. The sides of resistors 172, 174, 176, 178, 180, 182 and 184 remote from the junctions are grounded, and the sides of resistors 173, 175, 177, 179, 181, 183, and 185 remote from the junctions are connected to leads d—j, respectively. These leads are connected, in Fig. 6, to indicator lamps 186—192, respectively, the opposite terminals of these lamps being connected through lead k to low voltage bus 101. Lamps 186—192 are preferably located in the stimuli unit of Fig. 2 and are designed to be visible through glass 14. The lamps are of conventional type and illuminate jewels having identifiable and distinguishable objects thereon, such as the letters shown in Fig. 6. Resistors 173, 175 . . . 185 are made variable to permit adjustment of the light output of lamps 186—192 in accordance with the background illumination. The bleeder arrangement of the resistors and lamps permits warm-up thereof so that they will operate immediately upon swinger 161 touching their associated contacts.

The other swinger 160 of the stepping switch is connected to high voltage bus 97 and is designed successively to make contacts with contacts 195—204. Contact 195 is unconnected and represents the rest position of swinger 160, while contact 196 is also unconnected. Contacts 197—203 are connected to neon lamps 205—211, respectively, the opposite terminals of these lamps being connected through voltage-dropping resistor 212 to ground. It will be noted that lamps 205—211 will be actuated simultaneously with lamps 186—192, respectively, and therefore will indicate to the tester which of lamps 186—192 is operated at any moment. Since cycle timer 150 closes its switch 151 to pulse step coil 155 once every three seconds, lamps 186—192 and 205—211 will be operated at successively longer known time intervals after the start of the test. The neon lamps may be provided with appropriate time indicia, as indicated in Fig. 7, and may be mounted in any suitable fashion such that they are visible to the tester.

The last contact, 204, of the section of the stepping switch containing swinger 160, is connected to the side of relay 153 opposite the side connected to the normally closed contact of switch 151. When swinger 160 touches contact 204, relay 153 is energized to move the swinger 154 thereof away from contact 152 and stop the cycle timer. The relay also has a holding contact 215 connected to high voltage bus 97, and a swinger 216 which is connected to the lower side of relay 153 and designed to touch contact 215 when the relay is actuated.

When swinger 154 swings away from contact 152 on actuation of relay 153, it touches contact 217 which is connected through a reset switch 218 to a reset coil 219. The other end of reset coil 219 is connected through the series combination of rectifier 220 and resistor 221 to ground. Reset switch 218 is closed by the step coil by the last pulse supplied thereto and connects the reset coil across a source of voltage. The reset coil then operates to step the stepping switch back to its original, or rest position. The glare recovery switch 72 is then opened to release relay 153.

In operation of the apparatus for the glare recovery test, the tester closes glare recovery switch 72 to actuate the cycle timer through contact 152 and swinger 154 of relay 153, the high voltage bus 97, ground, and switch 72. Timer switch 151 then closes momentarily to step swingers 160 and 161 up one contact, then opens. Swinger 161 thus touches contact 163 to close a power circuit to headlights 12. The headlights shine in the driver's eyes and blind him. After three seconds, the timer switch 151 closes again to advance swingers 160 and 161 to contacts 197 and 164, respectively, thus operating lamp 186 in the stimuli unit and neon lamp 205 of Fig. 7. Then, at successive three second intervals, lamps 187, 206 . . . 192, 211 are operated, the preceding lamps being first extinguished. When the driver has recovered his vision sufficiently to recognize the indication of one of lamps 186—192, he calls out the identification and the tester notes which neon lamp is operated at that time. The time indication associated with that neon lamp is a measure of the glare recovery time of the driver.

The final tests to be made with the present apparatus are of the reaction times of the driver to stimuli. The most important reaction period is obviously that between operation of a stimulus, such as a red light or vision of a car turning out on the highway, and depression of the brake pedal, and this time interval also includes the time required to release the accelerator pedal. However, there are several other reactions that are important, and the complex reaction test of this apparatus tests at least most of them.

The reaction testing apparatus includes a double-pole, triple-throw switch 75, of Figs. 5 and 7, which has a center off position and opposite "simple" and "complex" positions. When the switch is turned to "simple" position to test the simple reaction, the swinger 225 of the switch, itself connected to high voltage bus 97, touches its "simple" contact. The driver then depresses accelerator 5 to complete a circuit between leads 48 and 49 of the accelerator switch. This establishes a circuit between leads *jj*, which is grounded, and *kk*. Lead *kk* is connected to lead *aa* which is connected to one side of the green lamp 28 in the signal stanchion of Figs. 6 and 3. The other side of lamp 28 is connected by lead *z* to a normally-closed contact 230 of a relay 231. The corresponding swinger 232 of the relay is connected to normally-closed contact 233 of a relay 234, and the corresponding swinger 235 of that relay is connected to high voltage bus 97. The green lamp 28 is thereby operated.

The test is started by the tester operating the push-button simple start switch 76 of Figs. 5 and 7. Operation of this switch closes a circuit from high voltage bus 97 to swinger 239 of relay 241. The normally-closed contact 240 of this swinger is connected to one side of the coil of relay 231 and the other side thereof is grounded. Relay 231 is thereby actuated, closing its swinger 242 on contact 243 to establish a holding circuit through switch 75. Actuation of the relay breaks the power circuit to green lamp 28 by moving swinger 232 away from contact 230 of the relay. Swinger 232 now touches contact 244, which is connected to lead *y*, thus putting high voltage on lead *y*. Lead *y* is connected to one side of red lamp 26 in the signal stanchion, the other side being connected through lead *x* to ground. Thus, red lamp 26 is energized when switch 76 is closed. At the same time, swinger 245 of relay 231, itself connected to high voltage bus 97, moves to touch contact 246 of the relay. Contact 246 is connected through contact 145 and swinger 144 of night vision switch 70 to the reaction clock timer 71, so that the reaction clock timer is energized.

When the driver sees red lamp 26, he releases accelerator 5 and depresses brake pedal 6 to close switch 50 of Figs. 6 and 4. The leads 51 and 52 of this switch are connected to leads *cc* and *gg*, the former being connected to high voltage bus 97. Depression of brake pedal 6 thus applies high voltage to lead *gg*. Lead *gg* is connected to one side of the coil of relay 241, and the other side of the coil is grounded. Relay 241 thus is actuated and breaks the power circuit of relay 231 at swinger 239. Relay 231 then releases to open the power circuit to reaction clock timer 71 at swinger 245 and open the power circuit to red lamp 26 at swinger 232 of the relay. The timer then stops and the simple reaction time between actuation of the stop signal and depression of the brake pedal is indicated on the timer. The timer may then be reset.

The complex reaction time test is begun by turning switch 75 through its off position to its "complex" position, thus connecting its grounded swinger 249 to one side of a timer 250 and of the coil of a relay 251. The other side of the coil of relay 251 is connected to lead *dd*, which is connected through the contacts of starter switch 8 to lead *cc*. Since lead *cc* is connected to bus 97, when the starter switch is operated, high voltage is connected across the coil of relay 251, actuating the relay. Swinger 252 of the relay thus moves to touch contact 253, which is connected to high voltage bus 97. Swinger 252 is connected to the side of timer 250 remote from its grounded side, so that the timer is actuated. Timer 250 includes a motor-driven shaft 254, Fig. 7a, which carries cams 255—259 which move swingers 260—264 once during each cycle of the timer. Swinger 260 is moved to a position touching contact 265 at the beginning of the cycle, and moved back to touch contact 266 at the end of the cycle. All of swingers 260—264 are connected to high voltage bus 97 and contact 265 is connected to the ungrounded side of timer 251, so that a holding circuit around relay 252 is established at the beginning of the cycle. Consequently, when start push button switch 8 is released, relay 251 is de-actuated, but timer 250 continues to operate until its cam 255 moves swinger 260 back to touch contact 266 and stop the timer.

When swinger 261 is moved by its cam 256, it touches contact 267 to establish a power circuit to the coil of relay 268 through the normally-closed swinger 269 and contact 270 of relay 271. Swinger 272 of relay 268 then touches contact 273 which applies ground to lead *a*, connected to the right turn lamp 274 of Fig. 6, the other side of lamp 274 being connected to lead *k* which is connected to low voltage bus 101. Lamp 274 then illuminates the right turn arrow of indicator 13 of the stimuli unit, Fig. 2. Swinger 275, on actuation of the relay, touches contact 276, to establish a power circuit for the reaction timer 71 through high voltage bus 97, swinger 275 and contact 276, contact 145 and swinger 144 of switch 70, and ground.

The coil of relay 271 is connected between ground and lead *ee*, which is connected to lead 39 of right turn switch 36. Lead 38 of the switch is connected to lead *cc* which is connected to high voltage bus 97, so that, when right turn switch 36 is actuated, relay 271 is actuated to de-actuate relay 268 and interrupt the power circuits to right turn lamp 274 and reaction timer 71. Relay 271 also establishes a holding circuit for itself through swinger 277 and contact 278, contact 278 being connected through timer contact 267 and swinger 261 to high voltage bus 97, and swinger 277 being connected to the ungrounded side of the coil of relay 271. Hence, once relay 271 is actuated, it remains actuated until timer cam 256 permits swinger 261 to move away from contact 267.

When timer swinger 262 is operated by cam 257 to touch contact 280, a power circuit to relay 281 is established from the high voltage bus 97 through timer swinger 262, contact 280, the normally-closed swinger 282 and contact 283 of relay 284, the coil of relay 281, and ground. Relay 281 is thus actuated to close its swinger 285 on grounded contact 286. Swinger 285 is connected to lead *b*, which is connected to one side of left turn lamp 287. The other side of lamp 287 is connected to low voltage bus 101 through lead *k*, so movement of timer swinger 261 causes actuation of left turn lamp 287 which is visible to the driver through the indicator 13 of Fig. 2. At the same time, the reaction timer 71 is actuated through swinger 290 of relay 281, which is connected to high voltage bus 97, contact 291, and the normally-closed contacts of switch 70.

One side of the coil of relay 284 is grounded and the other side is connected to lead *ff*, which is connected to lead 41 of left turn switch 37. When the left turn switch is actuated by proper movement of wheel 4 of Fig. 4, the ungrounded side of the coil of relay 284 is connected to high voltage bus 97 through lead *cc*, thus actuating the relay. Actuation of the relay interrupts the power circuit of the coil of relay 281 by moving swinger 282 away from contact 283. Thus, left turn lamp 287 is extinguished and the reaction timer is stopped, because of release of relay 281.

Relay 284 establishes a holding circuit for itself by moving its swinger 292, connected to the ungrounded side of the coil, against contact 293, which is connected to contact 280 of the timer. Consequently, when relay 284 is actuated, it remains actuated until cam 257 permits swinger 262 to move away from contact 280.

When timer swinger 263 is moved by cam 258 into contact with contact 295, it establishes a power circuit for the coil of relay 234 through the high voltage bus, swinger 263 and contact 295, normally-closed swinger 296 and contact 297 of a relay 298, and ground. When relay 234 is actuated, it closes a power circuit to amber lamp 27 through high voltage bus 97, swinger 235 and contact 298 of relay 234, lead *bb*, lamp 27, and grounded lead *x*. At the same time, the reaction clock timer is actuated through high voltage bus 97, swinger 300 and contact 301 of relay 234, the normally-closed contacts 144 and 145 of switch 70, and ground.

One side of the coil of relay 298 is grounded and the other side is connected to lead *ii*, which is connected to lead 47 of the accelerator switch, whose lead 46 is connected through lead *hh* to high voltage bus 97 through timer contacts 260 and 265. Thus, when the accelerator switch is actuated by release of accelerator pedal 5, relay 298 is actuated to interrupt the power circuit of relay 234, at swinger 296 and contact 297. The release of relay 234 causes extinction of lamp 27 and stoppage of clock timer 71. Relay 298 also establishes a holding circuit for itself through swinger 305, connected to its ungrounded side, and contact 306, connected to timer contact 295. Thus, relay 298 remains actuated until timer cam 258 releases swinger 263 from contact 295.

When timer swinger 264 is moved by cam 259, it touches contact 310 to establish a power circuit for relay 231 through the normally-closed contacts 239 and 240 of relay 241. When relay 231 is actuated, as described above in connection with the simple reaction test, red lamp 26 in the signal stanchion is actuated, as is the reaction clock timer 71.

The ungrounded side of the coil of relay 241 is connected to lead *gg*, which is connected to lead 52 of brake switch 50, whose other lead 51 is connected to high voltage bus 97 through lead *cc*. Thus, when the brake 6 is depressed to actuate switch 50, relay 241 is actuated to break the power circuit to the coil of relay 231 and thereby extinguish red lamp 26 and stop clock timer 71. Relay 241 also establishes a holding circuit for itself through its swinger 315, connected to the ungrounded side of its coil, and contact 316, connected to timer contact 310. Thus, once actuated, relay 241 remains actuated until timer swinger 264 moves away from contact 310 by reason of movement of cam 259.

When the cycle of timer 250 is complete, swinger 260 moves away from contact 265, stopping the timer, and into contact with contact 266. Contact 266 is connected to one side of "end" neon lamp 78 through normally-closed contacts 320 and 321 of relay 251. The other side of lamp 78 is connected to ground through voltage-dropping resistor 322, and simple-complex switch 75. Thus, lamp 78, shown on the control box of Fig. 5, operates to signal the end of the test.

In operation of the complex reaction time test, the tester moves the simple-complex switch 75 to its "complex" position, and the driver pushes the push button starter switch 8 to closed position. Relay 251 is thus actuated to start timer 250 and close contacts 260 and 265 thereof. These contacts keep the relay energized for one revolution of the timer shaft 254, though relay 251 is de-energized by release of the starter switch.

As shown, timer cam 256 next operates to move swinger 261 into contact with contact 267 to operate relay 268. Right turn lamp 274 is thus operated and reaction clock timer 71 is started. When the driver sees the right turn arrow of indicator 13 in the stimuli unit, he swings steering wheel 4 to the right. This action operates switch 36 to actuate relay 271, and, by releasing relay 268, to turn off right turn lamp 274 and stop timer 71.

The next cam operated is number 258, which moves swinger 263 into contact with contact 295 to actuate relay 234. Relay 234 actuates amber lamp 27 in the signal stanchion and starts timer 71 again. When the driver notices the amber light, he releases the accelerator pedal 5 to establish a circuit between leads 46 and 47 of the accelerator switch. This step results in actuation of relay 298 which, by release of relay 234, turns off amber lamp 27 and stops reaction timer 71.

Next, cam 257 moves swinger 262 into contact with contact 280, to actuate relay 281. Relay 281 actuates left turn lamp 287 of indicator 13 and starts reaction clock timer 71. When the operator notices the left turn arrow of indicator 13, he turns steering wheel 4 to the left to operate left turn switch 37. Operation of this switch causes actuation of relay 284 which, by release of relay 281, stops the timer and extinguishes the left turn lamp.

The next cam to operate a swinger is number 259, which moves swinger 264 into contact with contact 310, causing actuation of relay 231. Relay 231 closes actuating circuits for red lamp 26 in the signal stanchion and the reaction timer 71. When the driver sees the red light in signal stanchion 25, he removes his right foot from accelerator pedal 5 and depresses brake pedal 6. Depression of the brake pedal closes brake switch 50 to complete a power circuit to relay 241. Actuation of relay 241 results in extinction of red lamp 26 and stoppage of the reaction clock timer.

Timer 250 has now completed a cycle, one revolution of its shaft 254, and swinger 260 moves back into contact with contact 266, when the shaft stops its rotation. Lamp 78 then lights on the control unit to indicate the end of the test. The tester can then read the total time required for the various reactions, on the reaction clock timer.

The various stimuli for the complex reaction test can be actuated in any desired sequence, the sequence being changed by relative movement of cams 255—259 on shaft 254.

The apparatus of the present invention has been described in conjunction with drawings of a preferred embodiment thereof. It will be evident, however, that many minor changes could be made in the apparatus specifically described without departure from the scope of the invention. Accordingly, the invention is not to be considered limited to the specific apparatus described herein, but only by the scope of the appended claims.

I claim:

1. In an automobile driver testing apparatus having a test station for the driver, apparatus for testing the depth perception of the driver including a support, a pair of elongated pegs positioned adjacent each other with their long sides spaced in parallel relationship and mounted a substantial distance from the driver test station, one of said pegs being fixed to said support, means controllable by the driver from the driver test station for moving said other peg with respect to said fixed peg along the support in a plane substantially parallel to the long side of said other peg, a variable electrical resistance unit, said movable peg being fixedly connected to the control of said variable resistance unit such as to move the control in accordance with movement of the peg, means for measuring said resistance and recording the same in terms of the relative positions of the two pegs, electric signal lamps mounted on each of said pegs, means for energizing said lamps at the commencement of a depth perception test, and means for adjusting the relative quantity of electric current supplied to the two lamps so as to simulate the illumination conditions on a highway at night when the driver is approaching from the rear of one vehicle while a second car is approaching from the opposite direction.

2. In an automobile driver testing apparatus having a station for the driver, apparatus for testing the depth perception of the driver selectively under simulated daytime illumination and under simulated nighttime illumination including a cabinet having an internal chamber and a relatively small opening into said chamber facing the driver station, a pair of elongated pegs positioned within said chamber and spaced apart in a plane parallel to the plane of said opening with their long sides parallel, one of said pegs being fixed with respect to the cabinet, means controllable by the driver for moving the other peg substantially perpendicularly with respect to its length and to said plane of the opening, a variable resistance, said other peg being connected to said variable resistance to control its magnitude in accordance with movement of said other peg, means for measuring the magnitude of the variable resistance in order to indicate the relative positions of the two pegs, a first electric lamp mounted in said chamber, a pair of electric lamps mounted on said pegs, one on each peg, a source of voltage, means for selectively connecting said source of voltage to said first electric lamp and said pair of electric lamps, and means adjustable to vary the relative amounts of electric current supplied said pair of electric lamps.

3. Apparatus as defined in claim 2 including a timer having a switch controlled by the timer operable to open a circuit after a set interval of time, and means including said switch for connecting said source of voltage to said measuring means to energize it.

4. In an automobile driver testing apparatus having a station for the driver, apparatus for testing the glare recovery time of the driver comprising illumination means for simulating the glare of headlights of an approaching car at night including an electric lamp disposed to direct its light toward said station, a first plurality of electrically-operated indicators operable to display different indications to the driver, a second corresponding plurality of electrically-operated indicators operable to display time indications to the tester, a source of electric voltage, and switching means operable first to connect said electric lamp to said source of voltage, then to disconnect said lamp from said source and simultaneously to connect one of said first plurality of indicators and the corresponding one of said second plurality of indicators to said source, then sequentially to connect the others of said first plurality of indicators and the corresponding ones of said second plurality of indicators to said source of voltage.

5. The apparatus of claim 4 in which said switching means includes a timer for connecting the corresponding ones of said first and second plurality of indicators to said source at increasingly larger time intervals after the lamp is disconnected from said source.

6. In an automobile driver testing apparatus having a station for the driver, apparatus for testing the glare recovery time of the driver comprising a source of electric voltage, a pair of ganged stepping switches, a stepping coil operable upon its being supplied with current to advance the switch arms of said stepping switches to successive contacts of said switches, means including a timer for connecting said stepping coil to said source for a short period of time at set time intervals, at least one electric lamp facing the testing station operable to simulate the glare of the headlights of an approaching automobile at night, said lamp being connected to the contact of one of said switches first contacted by the corresponding switch arm during a cycle of the apparatus, a first plurality of electrically-operated indicators connected to successive contacts of said one of said switches, a second corresponding plurality of electrically-operated indicators for displaying time indications to the tester connected to the contacts of said other switch corresponding to the ones connected to said first plurality of indicators, said switch arms both being operable to complete an electric circuit between each of said indicators and said source of voltage when it contacts the contact to which the indicator is connected, and means controllable by the tester to actuate said timer to complete a cycle of the apparatus.

7. Apparatus as defined in claim 6 in which said timer has three contacts and alternately periodically establishes a circuit between a first and a second of said contacts and the third contact during a cycle of the apparatus, said third contact being connected to one side of said source when said timer is actuated and said stepping coil being connected between the other side of said source and said first contact, a relay having its coil connected between said second contact and a contact of one of said stepping switches contacted by the corresponding switch arm at the end of a cycle of the apparatus, said last-named switch arm being connected to said other side of the source, said timer being electrically-operable and connected to one side of the source when said timer is actuated, said relay having normally-closed contacts opened when said relay is actuated connecting said timer to the other side of said source whereby said timer is automatically stopped when a cycle of the apparatus is completed.

8. Apparatus as defined in claim 7 in which said relay has normally-open contacts closed when said relay is actuated and including a reset coil for stepping said switches back to their initial positions, said reset coil being connected between one side of said source and the other side of said source through said normally-open contacts.

9. In an automobile driver testing apparatus having a station for the driver, apparatus for testing the reaction time of the driver comprising a plurality of controls at said station including a first control simulating an accelerator pedal and having a first switch opened by operation of the control, a second control simulating a brake pedal and having a second switch closed by operation of said second control, and a third control simulating a steering wheel and having a third switch closed by operation of said third control; a plurality of electrically-operated indicators for furnishing signals to the driver including a first indicator for furnishing a "slow" signal, a second indicator for furnishing a "stop" signal, and a third indicator for furnishing a "turn" signal; a source of electric voltage, a timer having a plurality of pairs of normally open contacts successively closed during a cycle of operation of the timer, an electric clock timer and a pair of relays for each of said controls, one of each pair of relays having a pair of normally open contacts operable when closed to connect said clock timer to said source of voltage to actuate said clock timer, said one of each pair of relays also having a pair of normally-open contacts operable when closed to connect one of said indicators across said source, said last-named contacts on the first, second, and third of said relays being connected to said first, second, and third indicators, respectively; the fourth of said relays having a pair of normally closed contacts connected in series with the coil of said first relay, a first pair of said timer contacts, and the source, the coil of said fourth relay being connected in series with said first switch and the source; the fifth of said relays having a pair of normally closed contacts connected in series with the coil of said second relay, a second pair of said timer contacts, and the source, the coil of said fifth relay being connected in series with said second switch and the source; the sixth of said relays having a pair of normally closed contacts connected in series with the coil of said third relay, a third pair of said timer contacts, and the source, the coil of said sixth relay being connected in series with said third switch and the source.

10. Apparatus as defined in claim 9 having a fourth electrically-operated indicator for furnishing a "go" signal, a fourth switch closed by operation of said first control, said fourth indicator being connected in series with said fourth switch, normally closed contacts of said first and second relays, and the source.

11. Apparatus as defined in claim 10 including a start switch connected in shunt with said second set of timer contacts, switch means, circuit means including said switch means operable to connect said timer to said source of voltage to actuate it when the switch means is in one position, said start switch being operable instantaneously to actuate said second relay, said switch means being operable to close a circuit between the coil of said second relay and the source when the relay is operated and the switch means is in another position.

References Cited in the file of this patent

UNITED STATES PATENTS

| | | |
|---|---|---|
| 1,454,950 | Boyle | May 15, 1923 |
| 2,084,440 | Heinis | June 22, 1937 |
| 2,260,432 | Brown | Oct. 28, 1941 |
| 2,273,091 | De Silva | Feb. 17, 1942 |
| 2,401,975 | Simjian | June 11, 1946 |
| 2,618,209 | Silent | Nov. 18, 1952 |
| 2,751,812 | Sheppard et al. | June 26, 1956 |